United States Patent [19]

Willis

[11] Patent Number: 4,701,785
[45] Date of Patent: Oct. 20, 1987

[54] FRAME COMB FILTER HAVING FREEZE FRAME FEATURE

[75] Inventor: Donald H. Willis, Indianapolis, Ind.

[73] Assignee: RCA Corporation, Princeton, N.J.

[21] Appl. No.: 923,547

[22] Filed: Oct. 27, 1986

[51] Int. Cl.⁴ .............................................. H04N 9/78
[52] U.S. Cl. ................................. 358/31; 358/21 R; 358/22
[58] Field of Search ................ 358/21 R, 22, 31, 105

[56] References Cited

U.S. PATENT DOCUMENTS 4,249,212  2/1981  Ito et al. ................................ 358/22
4,272,787  6/1981  Michael et al. ...................... 358/160

FOREIGN PATENT DOCUMENTS 123280  9/1980  Japan ................................. 358/31

OTHER PUBLICATIONS

Ser. No. 876,432 filed 6/20/86 Topper et al.

Primary Examiner—John W. Shepperd
Attorney, Agent, or Firm—Paul J. Rasmussen; Eric P. Herrmann; Dilip A. Kulkarni

[57] ABSTRACT

A combination frame comb/freeze frame apparatus is disclosed. In the normal mode, the apparatus serves to separate one of the component signals (luma or chroma) from a composite video signal. In the freeze frame mode, the separated component signal is stored in the frame store, and repeatedly read out and displayed on the TV screen.

13 Claims, 2 Drawing Figures

FRAME COMB FILTER HAVING FREEZE FRAME FEATURE

This invention relates to a television receiver having a combination frame comb/freeze frame apparatus.

BACKGROUND

In a television receiver, a comb filter is typically used for separating the incoming composite video signal into its luminance (Y) and chrominance (C) components. In a line comb filter, a pair of signals which are time delayed with respect to each other by one horizontal scanning line interval are respectively added to each other and subtracted from each other to produce the luminance and chrominance components of the composite video signal. In a frame comb filter, the signals are time delayed by one frame period (instead of one line period) and then combined to produce component signals.

Comb filters operate on the premise that the composite video signal from horizontal-line-to-horizontal-line or frame-to-frame is highly correlated. When this assumption fails, as it frequently does with program video, certain anomalies occur in the reproduced images. The anomalies result from imperfect cancellation of the chrominance signal in the luminance signal and vice versa.

For example, when a line comb filter (also known as interline or line-to-line comb filter) is used for Y/C separation, an abrupt change in the amplitude of the chrominance signal between successive horizontal lines causes scintillating serrations or hanging dots along the horizontal edges in the displayed images. The hanging dots are due to incomplete cancellation of the chrominance signal from the separated luminance signal. Likewise, incomplete cancellation of the luminance signal from the separated chrominance signal gives rise to so-called cross-color effects.

In the case of a frame comb filter (also known as interframe or frame-to-frame comb filter), motion between successive frames causes phantom or secondary images to develop around the edges of moving objects. The phantom images result when motion is present, because picture information from consecutive frames is averaged for generating the separated luminance and chrominance signals.

Motion adaptive comb filter systems have been previously proposed that combine the advantages of both the line and frame comb filters. Essentially these motion adaptive Y/C separation systems output a frame combed signal when motion is absent, and a line combed signal when motion is present.

SUMMARY OF THE INVENTION

In accordance with this invention, the frame store in the motion adaptive comb filter apparatus of a TV receiver is advantageously used for generating a still or freeze frame picture. In the normal mode (picture not frozen), the frame store is used for generating a frame delayed composite video signal, so that it can be combined with the original non-delayed composite video signal in order to generate a combed component signal. In the freeze frame mode, the frame store is used for storing and then repeatedly recycling the combed component signal for the purposes of providing a still picture on the TV screen.

Pursuant to a further aspect of the present invention, a combed component signal from a line comb filter (instead of the frame combed signal) is stored in the frame store during the freeze frame mode when motion is present to avoid phantom images and to avoid picture jitter due to interfield motion.

In the Drawings:

FIG. 1 depicts a combination frame comb/freeze frame apparatus for the luma channel of a TV receiver in accordance with the principles of the present invention; and FIG. 2 illustrates a combination frame comb/freeze frame apparatus for the chroma channel of the TV receiver, also pursuant to this invention.

DETAILED DESCRIPTION

Figure 1:
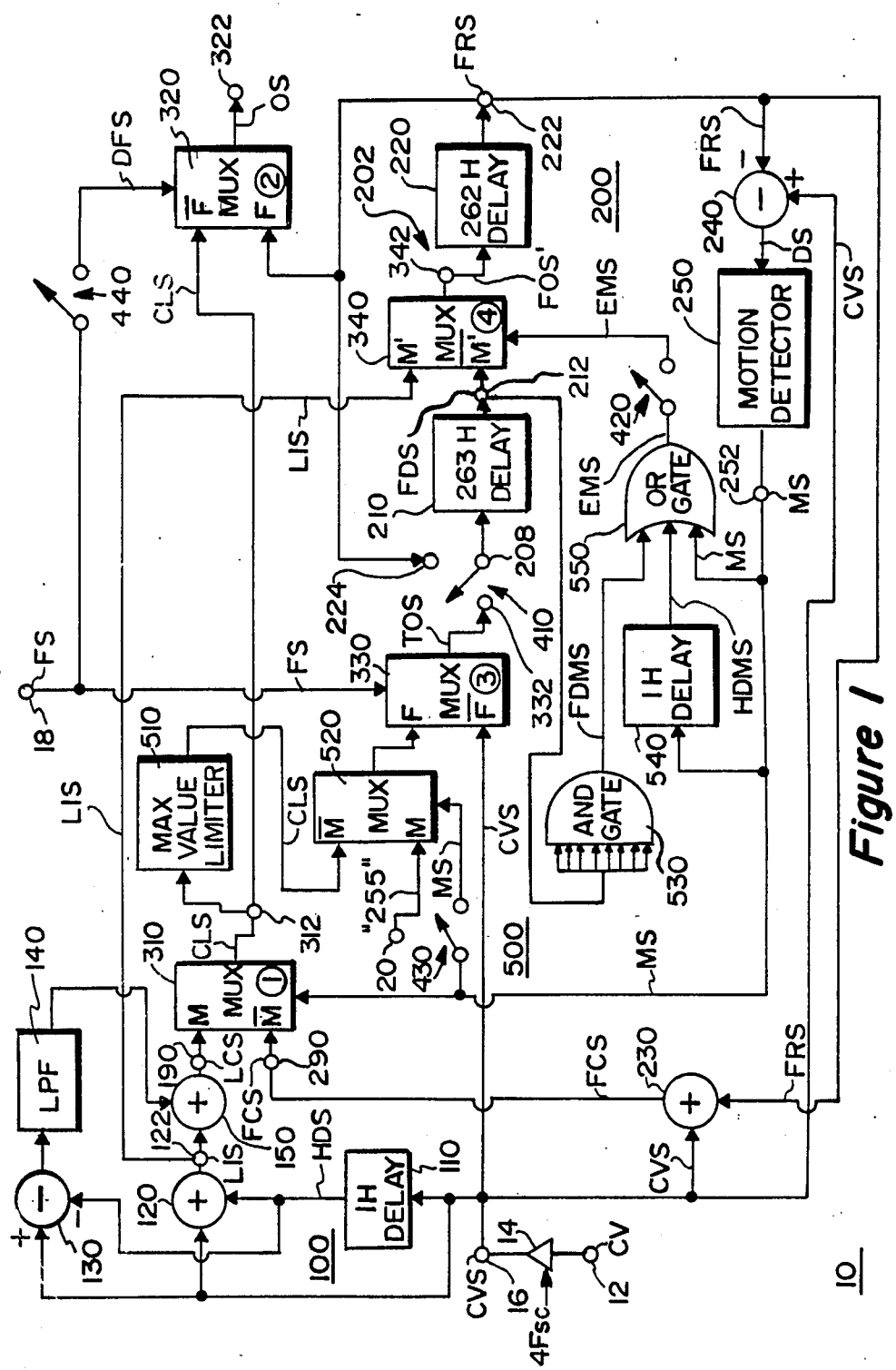

In the DRAWINGS, the lines interconnecting various blocks represent either single conductor connections carrying analog signals or multi-conductor buses carrying multi-bit parallel binary digital signals, as the case may be.

It will be readily appreciated by those skilled in the luma/chroma separation art that the invention may be practiced on either digital or analog representations of the composite video signal. For the purposes of the detailed description, however, it will be assumed herein that the composite video signal is an 8-bit binary digital signal unless otherwise stated, and that the video signal is in the NTSC format.

It will be further noted that the terms delay element and memory or storage element are used interchangeably in the following description. They are to be understood to have the same function.

FIG. 1 shows a combination frame comb/freeze frame apparatus 10 for the luma channel of a conventional TV receiver. This apparatus functions as a motion-adaptive frame comb under normal conditions. Under the frozen picture conditions, an appropriate combed luminance signal is stored in the frame memory for the first full frame period after the freeze frame command is given. Once the frame memory is loaded with the proper information (one frame's worth), it is repetitively read and displayed on the TV screen as long as the TV receiver continues in the freeze frame mode.

An interlaced composite color video signal CV in the NTSC format—for example, from a TV tuner/detector circuit—is applied to the input terminal 12 of an analog-to-digital (A/D) converter 14. The composite video signal CV consists of successive frames of picture information occurring at the rate of 30 frames a second. Each frame, in turn, comprises an odd field formed by a first plurality of horizontal scan lines and an even field defined by a second plurality of horizontal scan lines, which are interlaced between the first plurality of horizontal scan lines. The total number of horizontal scan lines in each frame is 525 in the NTSC system.

The A/D converter 14 is clocked with a sampling signal occurring at 4 times the color subcarrier frequency (i.e., $4F_{sc}$). The phase of the sampling signal is adjusted with respect to the phase of the color subcarrier signal (and then locked therewith), so as to produce a signal stream CVS of 8-bit binary digital samples at the output terminal 16 thereof in the following manner:

$$(Y+Q)'_{n-1}, (Y+I)'_{n-1}, (Y-Q)'_{n-1}, (Y-I)'_{n-1}, (Y+Q)'_{n-1} \quad (1)$$

$$(Y-Q)'_n, (Y-I)'_n, (Y+Q)'_n, (Y+I)'_n, (Y-Q)'_n \quad (2)$$

$$(Y+Q)'_{n+1}, (Y+I)'_{n+1}, (Y-Q)'_{n+1}, (Y-I)'_{n+1},$$
$$(Y+Q)'_{n+1} \qquad (3)$$

etc. In the above sample stream, Y represents the luminance component of the composite video signal CVS, and I and Q represent the color difference contributions of the chrominance component (C) of the composite video signal. The subscripts $n-1$, $n$ and $n+1$ respectively denote successive horizontal scan lines of a given field. The single prime indicates that the foregoing samples represent an odd frame.

It will be noted that, in the NTSC format, the chrominance component (C) is 180° out of phase on a line-to-line basis within a given field.

A sample stream (CVS) from the next following frame is given below:

$$(Y-Q)''_{n-1}, (Y-I)''_{n-1}, (Y+Q)''_{n-1}, (Y+I)''_{n-1},$$
$$(Y-Q)''_{n-1} \qquad (4)$$

$$(Y+Q)''_n, (Y+I)''_n, (Y-Q)''_n, (Y-I)''_n, (Y+Q)''_n \qquad (5)$$

$$(Y-Q)''_{n+1}, (Y-I)''_{n+1}, (Y+Q)''_{n+1}, (Y+I)''_{n+1},$$
$$(Y-Q)''_{n+1} \qquad (6)$$

etc. The double prime indicates that the samples are from the next following frame. The symbols Y, I, Q and n are defined similarly as for the preceding frame. It will be seen that the chrominance component (C) is 180° out of phase on a frame-to-frame basis.

Returning again to FIG. 1, the composite video signal CVS in the digital format at the terminal 16 is applied to a line comb filter 100 and a frame comb filter 200. Basically, the line comb filter 100 generates a line combed version LCS of the luminance component Y of the composite video signal CVS at its output terminal 190. Likewise, the frame comb filter 200 produces a frame combed version FCS of the luminance component Y at its output terminal 290. The output signals from the line comb filter 100 and the frame comb filter 200 are applied to a multiplexor 310. The multiplexor 310 applies either the line combed signal LCS or the frame combed signal FCS to its output terminal 312 as will be explained below.

The line comb filter 100 includes a 1−H delay element 110 for delaying the incoming composite video signal CVS by one horizontal line period. An adder 120 combines the incoming composite video signal CVS with a 1−H delayed composite video signal HDS at the output of the delay element 110 to generate a line interpolated video signal LIS at the output terminal 122 thereof.

The chrominance components are cancelled in the output of the adder 120 due to the 180° chroma phase relationship between the consecutive scan lines, and the luminance components therein are reinforced. The equation for the line interpolated signal LIS can be stated as follows:

$$LIS = 0.5(L_n + L_{n-1}) \qquad (7)$$

In the above equation, $L_n$ and $L_{n-1}$ represent vertically aligned pixels from lines n and $n-1$, respectively.

The line comb filter 100 further includes a subtractor 130 for subtracting the 1−H delayed composite video signal HDS from the current composite video signal CVS to produce a signal including a line combed chrominance signal plus the luminance vertical detail. The output of the subtractor 130 is low pass filtered in the filter 140 to generate a signal representing only the vertical detail in the scene. The output of the low pass filter 140 is added to the line interpolated signal LIS in the adder 150 to generate a line combed signal LCS with the vertical detail restored. The equation for the line combed signal LCS is:

$$LCS = 0.5(L_n + L_{n-1}) + 0.5(L_n - L_{n-1})_{LPF} \qquad (8)$$

The frame comb filter 200 consists of a first field memory or delay element 210, a second field memory or delay element 220 and an adder 230. The first and second memory elements 210 and 220 provide time delays of 263 and 262 horizontal scan lines respectively. In the normal frame comb mode, the memory elements 210 and 220 are serially connected with the input terminal 16 and a plurality of multiplexors 330, 340 and 410. The combined delay introduced by cascading the two memory elements 210 and 220 is equal to 525 horizontal scan lines or one frame period.

It will be seen that the signal FDS at the output of the first delay or memory element 210 is delayed by one field period with respect to the signal at the input thereof. The signal FRS at the output of the second delay or memory element 220 is delayed by one frame period in relation to the signal at the input port 16.

The incoming composite video signal CVS is added to the frame delayed composite video signal FRS in the adder 230 in the normal display mode. Because of the 180° phase relationship between the respective samples of the successive frames, the chrominance components cancel, thereby leaving only the luminance components in the output signal FCS at the terminal 290 of the adder 230. The equation for the frame combed signal FCS is as follows:

$$FCS = 0.5(CVS + FRS) \qquad (9)$$

In the above equation, CVS and FRS represent spatially coterminous pixels from consecutive frames.

A subtractor 240 subtracts the frame delayed composite video signal FRS from the incoming non-delayed composite video signal CVS to generate a difference signal DS indicative of scene motion occurring between images from consecutive frames. A motion detector 250 processes the difference signal DS to generate an interframe motion signal MS at the output terminal 252 thereof.

The motion signal MS, in this particular embodiment, is a 1-bit binary signal. When the interframe image motion is detected, the motion signal MS is set equal to logical one. When the interframe image motion is absent, the motion signal MS is set equal to logical zero. Any one of many known interframe image motion detectors may be implemented for the motion detector 250.

The line combed signal LCS and the frame combed signal FCS are applied to the input terminals of the first multiplexor 310. The multiplexor 310, responsive to the motion signal MS, passes the line combed signal LCS to the output terminal 312 when motion is present, and passes the frame combed signal FCS to its output terminal when motion is absent. The combed luminance signals (LCS or FCS or a combination thereof) at the output of the first multiplexor 310 is designated as CLS.

The combed luminance signal CLS at the output of the first multiplexor 310 and the stored signal at the output of the second delay element 220 are applied to the input terminals of a second multiplexor 320. The multiplexor 320, responsive to a 1-bit binary freeze frame signal FS, couples one of its two input terminals to the output terminal 322. In the normal display mode (FS=0), the multiplexor 320 couples the combed luminance signal CLS from the multiplexor 310 to the output terminal 322. In the freeze frame mode (DFS=1), the multiplexor 320 applies the output signal from the field memory 220 to its output terminal 322 in the manner explained later. The output of the multiplexor 320 is coupled to the Y input terminal of an RGB matrix (not shown) of the TV receiver.

The freeze frame signal FS goes high (FS=1) at the beginning of the first full field after the freeze frame command is given by the TV control system. The freeze frame signal FS remains high until the normal display mode is later restored.

The combed luminance signal CLS at the output of the first multiplexor 310 and the incoming composite video signal CVS are coupled to the input terminals of a third multiplexor 330. The third multiplexor 330, responsive to the freeze frame signal FS, provides at its output terminal 332, the incoming composite video signal CVS in the normal display mode (FS=0), and the combed luminance signal CLS in the freeze frame mode (FS=1). The output terminal 332 is coupled to the first delay element 210 via the multiplexor 410.

The multiplexor 410 is normally conditioned to couple the incoming composite video signal CVS from the multiplexor 330 to the first delay element 210 while the TV receiver is in the normal display mode (FS=0). The multiplexor 410 remains in this condition for the duration of one frame period after the freeze frame signal FS goes high (FS=1) in order to store one frame of combed luminance signal CLS in the memory elements 210 and 220.

After the elapse of one frame period following the onset of the freeze frame signal FS, the multiplexor 410 is conditioned to couple the output of the second delay element 220 back to the input of the first delay element 210 to recycle the combed luminance signal CLS stored in the memory elements 210 and 220 as long as the TV receiver remains in the freeze frame mode.

The line interpolated signal LIS and the field delayed signal FDS are coupled to the respective input terminals of a multiplexor 340. A 1-bit binary extended motion signal EMS (to be explained below) is applied to the control terminal of the multiplexor 340 via a gate 420. The extended motion signal EMS serves to minimize the motion-related artifacts in the frozen picture. The gate 420 is closed only during the second field period after the freeze frame signal FS goes high, and is open otherwise. During the second field period, the multiplexor 340 couples the line interpolated signal LIS to the second delay element 220 when the extended motion signal EMS is high. The line interpolated signal LIS is the same as the line combed signal LCS minus the vertical detail. Otherwise, during the second field period, the multiplexor 340 couples the combed luminance signal CLS from the first memory 210 to the second memory 220.

To generate the extended motion signal EMS, a multi-input OR gate 550 has its input terminals coupled for receiving the motion signal MS, a 1−H delayed motion signal HDMS, and a one field delayed motion signal FDMS. The extended motion signal EMS goes high whenever one or more of the following three conditions exist:

The motion detector 250 detects motion, or

The motion detector 250 detected motion during the preceding line period, or

The motion detector 250 detected motion one field period (or 263 line periods) ago.

To generate the field delayed motion signal FDMS, a sample value of, for example, 1111 1111 or 255 is substituted for the signal (CLS) sample values applied to the first delay or memory element 210 when the motion signal MS is high. In order to discriminate between the stored motion identifying substitute samples and the stored signal samples, the signal samples are passed through a limiter 510, which limits the signal samples to values less than the substitute sample values (i.e., 1111 1111).

The substitute samples are applied to the M input port of a multiplexor 520 and the limited signal samples CLS from the limiter 510 are applied to the second input port $\overline{M}$, of the multiplexor 520. The motion signal MS is coupled to the control terminal of the multiplexor 520 via a gate 430. The gate 430 is conditioned to pass the motion signal MS to the control terminal of the multiplexor 520 only during the first field period after the freeze frame signal FS goes high.

During this first field period, the multiplexor 520 couples the (motion identifying) substitute samples to its output terminal when the motion signal MS is high, and couples the limited signal samples CLS to the output terminal when the motion signal MS is low. During all other times, the multiplexor 520 couples the signal samples CLS from the limiter 510 to its output terminal.

A multi-input AND gate 530 is coupled to the output of the first delay element 210 in order to detect the presence of the substitute samples (i.e., 1111 1111)—indicative of the interframe image motion during the preceding field period. When all logical ones are detected in the output of the first delay element 210, the output signal FDMS of the multi-input AND gate 530 goes high.

A 1−H delay element 540 is coupled to the output of the motion detector 250 to generate the 1−H delayed motion signal HDMS. As previously indicated, the motion signal MS, 1−H delayed motion signal HDMS, and the one field delayed motion signal FDMS are all coupled to the input ports of the multi-input OR gate 550 to generate the extended motion signal EMS.

The freeze frame signal FS present at a terminal 18 of the TV control system (not shown) is applied to the control terminal of the output signal multiplexor 320 via a gate 440, which is normally open. The gate 440 is conditioned to pass the freeze frame signal FS one frame period after the signal FS goes high, and continues in this state during the freeze frame operation of the TV receiver. The intention here is to delay the application of the freeze frame signal FS to the output multiplexor 320 by one frame period.

The control signals applied to the multiplexor 410 and the gates 420, 430 and 440 are given below:

TABLE

| TIME PERIOD | SWITCH | | | |
|---|---|---|---|---|
| | 410 | 420 | 430 | 440 |
| 1. Normal Display | low | low | low | low |
| 2. Freeze Frame | | | | |
| 1st Field | low | low | high | low |
| 2nd Field | low | high | low | low |
| 3rd and higher fields | high | low | low | high |

The multiplexor 410 couples the output of the multiplexor 330 to the first memory 210 when the control signal applied to it is low. Otherwise, it recycles the output of the second memory 220 to the input of the first memory 210.

The gates 420, 430 and 440 are disabled and enabled when the associated control signals are respectively low and high. The gates 420, 430 and 440 are banks of AND gates—each AND gate in the bank having one input coupled to the associated control signal and the respective second inputs coupled to the respective ones of the signal bits.

The operation of the combination frame comb/freeze frame apparatus 10 for the luma channel of the TV receiver will now be summarized.

1. For normal operation (not frozen):
   (a) The multiplexor 310, responsive to the motion signal MS, couples either the line combed signal LCS or the frame combed signal FCS to its output terminal 312.
   (b) The gate 440 being disabled, the multiplexor 320 applies the combed luminance signal CLS from the multiplexor 310 to the output terminal 322.
   (c) The multiplexors 330, 340 and 410 couple the delay elements 210 and 220 in cascade with the input terminal 16 and the adder 230.
   (d) The gates 420, 430 and 440 are all disabled.

2. During the first field period after the freeze frame signal FS goes high:
   (a) The multiplexor 310 continues to couple the combed luminance signal CLS to the multiplexor 320.
   (b) The multiplexor 320 continues to apply the combed luminance signal CLS to the output terminal 322.
   (c) The gate 430 being enabled, the multiplexor 520 couples the combed luminance signal CLS to the multiplexor 330 when motion is absent, and couples the motion identifying signal MIS (i.e., 1111 1111) to the multiplexor 330 when motion is present.
   (d) The multiplexors 330 and 410 apply the output of the multiplexor 520 to the first memory 210.
   (e) The gate 420 being disabled, the multiplexor 340 couples the uncombed video signal from the first memory 210 to the second memory 220.
   (f) As indicated above, the gate 430 is enabled and the gates 420 and 440 are disabled.

3. During the second field period after the freeze frame signal FS goes high:
   (a) The multiplexors 310 and 320 continue to couple the combed luminance signal CLS to the output terminal 322.
   (b) The gate 430 being disabled, the multiplexor 520 couples the combed luminance signal CLS to the multiplexor 330.
   (c) The multiplexors 330 and 410 apply the combed luminance signal CLS from the multiplexor 520 to the first memory 210.
   (d) The gate 420 being enabled, the multiplexor 340 couples the output of the first memory 210 to the second memory 220 when the extended motion signal is low. Otherwise, it applies the line interpolated signal LIS from the adder 120 to the second memory 220.
   (e) As mentioned above, the gate 420 is enabled, and the gates 430 and 440 are disabled.

4. During the third and higher fields after the freeze frame signal FS goes high, and as long as the TV receiver is operating in the freeze frame mode:
   (a) The multiplexor 410 recycles the output of the second memory 220 to the input of the first memory 210.
   (b) The gate 420 being disabled, the multiplexor 340 couples the output of the first memory 210 to the input of the second memory 220.
   (c) The gate 440 being enabled, the multiplexor 320 couples the output of the second memory 220 to the output terminal 322.
   (d) As indicated above, the gate 440 is enabled and the gates 420 and 430 are disabled.

It will be noted that during the first field after the freeze frame signal FS goes high, the uncombed video signal from the first memory 210 will be fed to the second memory 220 regardless of the value of the extended motion signal EMS. This is so because the gate 420 is kept disabled during the first field. During the second field period, the frame-delayed, uncombed video signal FRS from the second memory 220 is applied to the frame comb adder 230 and the motion detector subtractor 240. This is essential in order to continue to generate the frame combed luminance signal FCS, and the interframe motion signal MS during the second field period.

Figure 2:
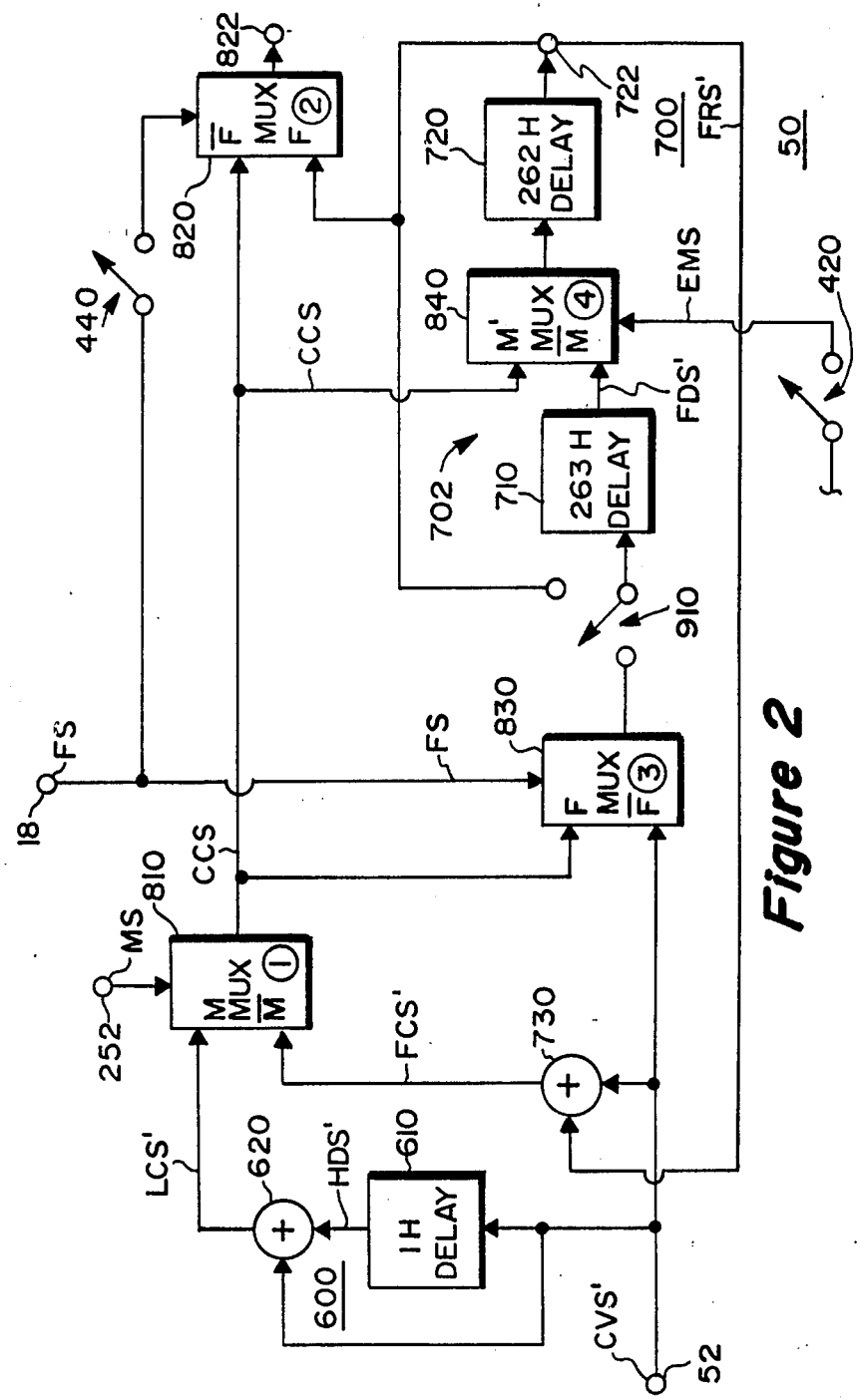

The combination digital freeze frame/frame comb apparatus 50 for the chroma channel of the TV receiver is shown in FIG. 2. The structure of the combination chroma processing apparatus 50 of FIG. 2 is similar in many respects to the FIG. 1 luma processing apparatus, but is substantially simpler for two reasons. First, the chroma vertical resolution is not as critical. Second, the motion signals (MS, HDMS, FDMS and EMS) developed in the FIG. 1 apparatus are used in both systems.

The combination chroma processing apparatus 50 is interposed between the chroma demodulation circuitry in the chroma channel of the TV receivers and the RGB matrix. The demodulated chroma signal CVS' of the 8-bit binary digital samples fed to the input port 52 of the combination chroma processing apparatus 50 is given below:

$$(Q+Y)_{n-1}, (I+Y)_{n-1}, (Q-Y)_{n-1}, (I-Y)_{n-1}, (Q+Y)_{n-1} \quad (10)$$

$$(Q-Y)_n, (I-Y)_n, (Q+Y)_n, (I+Y)_n, (Q-Y)_n \quad (11)$$

$$(Q+Y)_{n+1}, (I+Y)_{n+1}, (Q-Y)_{n+1}, (I-Y)_{n+1}, (Q+Y)_{n+1} \quad (12)$$

etc.

The polarity of the luminance signal (Y) in the chroma demodulator output alternates by 180° from line to line. It means that the luminance signal components of the vertically aligned pixels of a given field have opposite polarity. In the same vein, the luminance components of the pixels from successive frames occupying the same position on the TV screen have opposite polarity.

It will be noted that the demodulated chroma signal CVS' (signal sequences 10, 11 and 12) is obtained by selectively inverting the polarity of the composite video signal CVS (signal sequences 1, 2 and 3).

The chroma processing apparatus 50 includes a line comb filter 600, a frame comb filter 700 and a plurality of multiplexors 810–840. The operation of the chroma processing apparatus 50 is similar to the operation of the luma processing apparatus 10. In the normal mode, it functions as a motion adaptive comb filter. In the freeze frame mode, a combed chrominance signal is stored in the frame memory for one full frame period, and then repetitively read and displayed.

An adder 620 adds the incoming demodulated chroma signal CVS' to a 1−H delayed composite video signal HDS' at the output of a 1−H delay element 610 to generate a line combed chrominance signal LCS'. The luminance signal components (being 180° out of phase from line to line) cancel each other, and the chrominance signal components (being in phase) reinforce each other in the output of the line comb adder 620.

Another adder 730 adds the incoming demodulated chroma signal CVS' to a one frame delayed demodulated chroma signal FRS' from the output of a frame store 702 to generate a frame combed chrominance signal FCS'. A multiplexor 810, responsive to the motion signal MS, passes the line combed chrominance signal LCS' to the output terminal 822 when motion is present, and passes the frame combed chrominance signal FCS' to the output terminal 822 when motion is absent in the normal display mode of the TV receiver.

During the first field period after the freeze frame signal FS goes high, the combed chrominance signal CCS from the output of the multiplexor 810 is applied to the input of the first field memory 710 via a multiplexor 910. During this period, the uncombed video signal FDS' from the first memory 710 is passed to the second memory 720.

During the second field period of the frame store writing interval, the combed chrominance signal CCS from the multiplexor 810 is fed to the first field memory 710 and the multiplexor 840. In this interval, the second field memory 720 outputs a frame-delayed, uncombed video signal FRS'—suitable for application to the frame comb adder 730.

During the third and higher field intervals of the freeze frame operation, the multiplexor 910 recycles the output of the second memory 720 to the input of the first memory 710. A multiplexor 820, responsive to the freeze frame signal FS, applies the output of the second field memory 720 to the output terminal 822.

Basically, the combination chroma processing apparatus 50 separates the chroma signal component from the demodulated chroma signal CVS' during the normal display mode. In the freeze frame mode, the combed chrominance signal CCS is stored in the frame store 702, and repeatedly read out and fed to the RGB matrix of the TV receiver along with the combed luminance signal CLS from the FIG. 1 apparatus.

What is claimed is:

1. A television apparatus for separating at least one of the luminance and chrominance components from an interlaced composite video signal CVS consisting of successive frames of picture information; each of said frames having a first field defining a first plurality of horizontal scan lines and a second field defining a second plurality of horizontal scan lines interposed between said first plurality of scan lines; said apparatus having a freeze frame feature comprising:

an input port for applying said incoming composite video signal CVS;
a source of a freeze frame signal FS;
line combing means coupled for receiving said incoming composite video signal CVS for generating a line combed signal LCS representative of the line combed version of said at least one separated component;
first and second delay elements serially connected with said input port for delaying said incoming composite video signal CVS by one field period and by one frame period, respectively to produce a field delayed composite video signal FDS and a frame delayed composite video signal FRS;
means for combining said incoming composite video signal CVS and said frame delayed composite video signal FRS to produce a frame combed video signal FCS representative of the frame combed version of said separated component;
motion detecting means having input terminals coupled for receiving said incoming composite video signal CVS and said frame delayed composite video signal FRS for generating an interframe motion signal MS;
first switching means having an output terminal at which a combed component signal CS is available, and further having input terminals coupled for receiving said line combed signal LCS and said frame combed signal FCS; said first switching means, responsive to said motion signal MS, selectively coupling said line combed signal LCS or said frame combed signal FCS to its output terminal;
second switching means having an output terminal at which an output signal OS is available, and further having input terminals coupled for receiving said combed signal CS and the output of said second delay element; said second switching means, responsive to said freeze frame signal FS, selectively coupling said combed signal CS or said output of said second delay element to its output terminal;
third switching means having input terminals coupled for receiving said incoming composite video signal CVS and said combed component signal CS; said third switching means, responsive to said freeze frame signal FS, providing a signal for application to said first delay element;
fourth switching means having input terminals coupled for receiving the respective outputs of said first delay element and said line combing means; said fourth switching means, responsive to said motion signal, providing a signal for application to said second delay element; and
means interposed between said motion detecting means and said fourth switching means for applying said motion signal MS to said fourth switching means only during the second field period following the onset of said freeze frame signal, and precluding the application thereof otherwise.

2. The apparatus defined in claim 1 further including:
means coupled to said motion detecting means for delaying said motion signal MS by one field period to generate a field delayed motion signal FDMS; and
a multi-input OR gate having its inputs coupled for receiving said non-delayed motion signal MS and said field delayed motion signal FDMS for generating an extended motion signal EMS for application to said fourth switching means.

3. The apparatus defined in claim 2 wherein said means for delaying said motion signal MS by one field period comprises:
further switching means interposed between said first switching means and said third switching means and responsive to said non-delayed motion signal MS for generating a signal for application to said first delay element via said third switching means; said signal applied to said first delay element being equal to said combed signal CS when motion is absent and a motion identifying signal MIS when motion is present; said non-delayed motion signal being applied to said further switching means only during the first field period following the onset of said freeze frame signal FS; and means interposed between said first delay element and said OR gate for detecting the presence of said motion identifying signal MIS to provide said field delayed motion signal FDMS.

4. The apparatus defined in claim 3 further including means interposed between said first switching means and said further switching means for limiting the maximum value of said combed signal CS within a given range; wherein said motion identifying signal MIS consists of a value outside said given range.

5. The apparatus defined in claim 4 wherein said combed signal CS is an 8-bit binary digital signal; wherein said limiting means limits the value of said 8-bit digital signal CS to a value below a value defined by all logical ones; wherein said motion identifying signal MIS is equal to a value defined by all logical ones; wherein said means for detecting said motion identifying signal MIS comprises a multi-input AND gate having its inputs coupled for receiving the respective bits of the signal at the output of said first delay element and having its output coupled to said multi-input OR gate.

6. The apparatus defined in claim 2 further including means coupled to said motion detecting means for delaying said motion signal MS by one horizontal line period to generate a line-delayed motion signal LDMS for application to said multi-input OR gate along with said non-delayed motion signal MS and said field-delayed motion signal FDMS.

7. The appratus defined in claim 1 wherein said line combed video signal LCS generated by said line combing means corresponds to said first field; wherein said line combing means further generates a line interpolated signal LIS by averaging two adjacent lines of said first field to produce each of the lines of said second field disposed half-way between said adjacent lines; wherein said line combed signal LCS and said line interpolated signal LIS are respectively applied to said first and said second delay elements via said third and fourth switching means.

8. The apparatus defined in claim 1 further including means interposed between said freeze frame signal source and said second switching means for delaying the application of said freeze frame signal FS to said second switching means until one frame period following said onset of said freeze frame signal.

9. The apparatus defined in claim 1 wherein said first switching means, responsive to said motion signal MS, provides at the output thereof said line combed video signal LCS when motion is present and said frame combed video signal FCS when motion is absent.

10. The apparatus defined in claim 1 wherein said first switching means, responsive to said motion signal MS, provides at the output thereof a weighted combination of said line combed video signal and said frame combed video signal.

11. A television apparatus for separating the luminance component from an interlaced composite video signal CVS consisting of successive frames of picture information; each of said frames having a first field defining a first plurality of horizontal scan lines and a second field defining a second plurality of horizontal scan lines interposed between said first plurality of scan lines; said apparatus having a freeze frame feature comprising:

an input port for applying said incoming composite video signal CVS:

a source of a freeze frame signal FS;

first means for generating from said incoming composite video signal CVS (1) a line combed video signal LCS corresponding to said first field, and (2) a line interpolated video signal LIS corresponding to said second field;

first and second delay elements serially connected with said input port for delaying said incoming composite video signal CVS by one field period and by one frame period, respectively, to produce a field delayed composite video signal FDS and a frame delayed composite video signal FRS;

means for additively combining said incoming composite video signal CVS and said frame delayed composite video signal FRS to produce a frame combed vidoe signal FCS corresponding to said first field;

motion detecting means having input terminals coupled for receiving said incoming composite video signal CVS and said frame delayed composite video signal FRS for generating an interframe motion signal MS;

first switching means having an output terminal at which a combed luminance signal CLS is available, and further having input terminals coupled for receiving said line combed signal LCS and said frame combed signal FCS; said first switching means, responsive to said motion signal MS, selectively coupling said line combed signal LCS or said frame combed signal FCS to its output terminal;

second switching means having an output terminal at which an output signal OS is available, and further having input terminals coupled for receiving said combed luminance signal CLS and the output of said second delay element; said second switching means, responsive to said freeze frame signal FS, selectively coupling said combed luminance signal CLS or said output of said second delay element to its output terminal;

third switching means having input terminals coupled for receiving said incoming composite video signal CVS and said combed luminance signal CLS; said third switching means, responsive to said freeze frame signal FS, providing a signal for application to said first delay element;

fourth switching means having input terminals coupled for receiving the output of said first delay element and said line interpolated signal LIS; said fourth switching means, responsive to said motion signal MS, providing a signal for application to said second delay element;

means interposed between said motion detecting means and said fourth switching means for applying said motion signal to said fourth switching means only during the second field period following the onset of said freeze frame signal, and precluding the application thereof otherwise; and means for recycling the output of said second delay element to the input of said first delay element upon completion of one frame period following said onset of said freeze frame signal FS.

12. A Y/C separation apparatus for a television receiver having a freeze frame mode comprising;
   a source of an incoming composite video signal CVS;
   frame store means coupled to said video signal source for delaying said incoming composite video signal CVS by one frame period to produce a frame delayed composite video signal FRS;
   means for combining the incoming composite video signal with the frame delayed composite video signal to provide a frame combed video signal FCS;
   means for storing said frame combed video signal FCS in said frame store means during said freeze frame mode for generating a still picture.

13. The Y/C separation apparatus defined in claim 12 further including:
   means coupled to said frame store means for detecting interframe motion;
   line combing means coupled to said video signal source for producing a line combed video signal LCS; and
   switching means having an output terminal at which a combed component signal CS is available, and further having input terminals coupled for receiving said line combed signal LCS and said frame combed signal FCS; said switching means, responsive to the output of said motion detecting means, selectively coupling either said line combed signal LCS or said frame combed signal FCS to its output terminal;
   wherein said combed component signal CS is stored in said frame store means during said freeze frame mode to produce a still picture.

* * * * *